United States Patent Office 3,575,890
Patented Apr. 20, 1971

3,575,890
OXAZINE AND OXAZOLINE DERIVED C-N BACKBONE POLYMERS
Morton Herbert Litt, University Heights, Cleveland, Ohio, Francis W. Evans, Pratteln, Switzerland, and Joseph T. Melillo, South Orange, N.J., assignors to Allied Chemical Corporation, New York, N.Y.
No Drawing. Filed Feb. 26, 1969, Ser. No. 802,672
Int. Cl. C08g 33/02
U.S. Cl. 260—2
6 Claims

ABSTRACT OF THE DISCLOSURE

Polymers comprising recurring units of the structure:

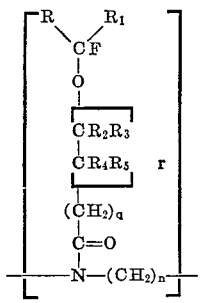

wherein R and $R_1$, which can be the same or different, are perhalogenated alkyl radicals in which the halogen atoms are chlorine, or fluorine, with at least one fluorine atom being attached to each carbon atom; wherein R and $R_1$ together contain a total of from 2 to 8 carbon atoms; wherein $R_2$, $R_3$, $R_4$ and $R_5$ are independently chlorine, fluorine, hydrogen, or perfluoromethyl with not more than one of the substituent groups $R_2$, $R_3$, $R_4$ or $R_5$ in any

unit being trifluoromethyl, and not more than two being chlorine; wherein $r$ is 0 to 5; wherein $q$ is 0 to 11 with $q$ being at least 1 when $r=0$; and wherein $n$ at each occurrence is independently 2 or 3; have a low critical surface energy and are useful in imparting oil and water repellency to fabrics impregnated or coated therewith.

These polymers are prepared from novel monomers of the structure

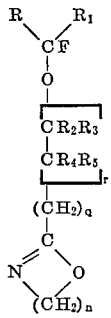

wherein $n$ is 2 or 3, and wherein R, $R_1$, $R_2$, $R_3$, $R_4$, $R_5$, $r$ and $q$ are as defined above.

BACKGROUND OF THE INVENTION

This invention relates to oxazine and oxazoline monomers and to the carbon-nitrogen backbone chain polymers and copolymers derived therefrom.
More particularly, it relates to oxazine and oxazoline monomers and to the therefrom-derived polymers and copolymers having a perhalogenated-isopropoxy or perhalogenated - substituted - isopropoxy ether group-terminated side chain.

The polymers and copolymers of the instant invention have been found to possess an extremely low critical surface energy of 20 dynes/cm. or, in many instances, significantly less. Owing to this low critical surface energy, the polymers of the instant invention, when coated onto fabric or any other normally absorbent substrate such as wood impart to such substrate the characteristic of both water and oil repellency. While chemicals, usually polymeric, which will impart either water or oil repellency to a substrate are well known, chemicals imparting both oil and water repellency are comparatively rare. The polymers and copolymers of the instant invention not only impart dual repellency to treated substrates, but they are easily produced and readily applied.

SUMMARY OF THE INVENTION

It is an object of this invention to provide new polymeric materials which are useful at imparting water and oil repellency to absorbent substrates.
It is a further object of this invention to provide readily available polymer materials having the above-indicated utility.
Further objects and advantages will become apparent from the description of the invention which follows in greater detail.

The useful polymeric materials of the instant invention comprise recurring units of the structure:

(I)
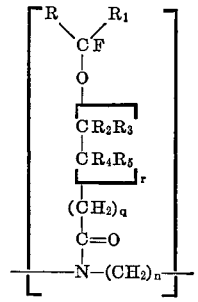

wherein R and $R_1$, which can be the same or different, are perhalogenated alkyl radicals in which the halogen atoms are chlorine or fluorine, with at least one fluorine atom being attached to each carbon atom; wherein R and $R_1$ together contain a total of from 2 to 8 carbon atoms; wherein $R_2$, $R_3$, $R_4$ and $R_5$ are independently chlorine, fluorine, hydrogen, or perfluoromethyl, with not more than one of the substituent groups $R_2$, $R_3$, $R_4$ or $R_5$ in any

unit being trifluoromethyl, and not more than two being chlorine; wherein $r$ is 0 to 5; wherein $q$ is 0 to 11 with $q$ being at least 1 when $r=0$; and wherein $n$ at each occurrence is independently 2 or 3. This invention contemplates polymers comprising recurring units of structure (I) wherein $n$ is exclusively 2 or recurring units wherein $n$ is exclusively 3 or a mixture of units wherein $n$ is 2 with units wherein $n$ is 3.

U.S. Pat. No. 3,293,245 describes polymers of the structure:

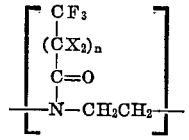

wherein $n=0-15$. U.S. Patent No. 3,373,194 and application Ser. No. 599,718, filed Dec. 7, 1966, now U.S. Patent No. 3,458,456, granted July 29, 1969, describe polymers and copolymers of the structure:

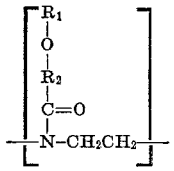

wherein $R_1$ is a $C_1$–$C_{12}$ alkyl or halogenated alkyl group and $R_2$ is a $C_1$–$C_{10}$ alkylidene group. U.S. Patent No. 3,198,754 discloses polymers of the structure:

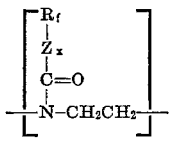

wherein $x$ is 0 or 1, wherein $Z$ can be —O—$(CF_2)_2$— and wherein $R_f$ is perfluoroalkyl.

However, none of the aforementioned patents or applications teach oxazine or oxazoline polymers having the terminal perhaloisopropoxy or perhalo-$C_4$-$C_9$ isoalkoxy group as described and claimed in the instant invention. We have found that such terminal groups afford polymers of especially low critical surface energy.

The value of $q$ does not affect the value of the critical surface energy to a significant extent. For example, in the pair of polymers of the instant invention, wherein $R$ and $R_1$ are trifluoromethyl, $r=0$ and $n=2$, the polymers wherein $q=1$ and $q=10$ have essentially the same critical surface energy. Likewise, in the pair of polymers, wherein $R$ and $R_1$ are trifluoromethyl, $r=2$, $n=2$, and $q=3$ and $q=10$, the critical surface energies are essentially the same. However, in general, the critical surface energy is significantly affected by the nature of the R, $R_1$, $R_2$, $R_3$, $R_4$ and $R_5$ groups and by the value of $r$ for a given value of $q$ and $n$.

The polymers of the instant invention, wherein $n$ is exclusively 2, are prepared by polymerization with a cation active catalyst of 2-substituted-$\Delta^2$-oxazolines of the structure:

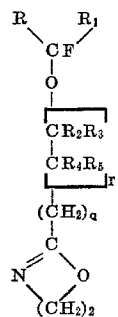

wherein R, $R_1$, $R_2$, $R_3$, $R_4$, $R_5$, $r$ and $q$ are as defined above in accordance with the procedure taught in copending, commonly assigned U.S. patent application Ser. No. 382,343, filed July 13, 1964, now U.S. Patent No. 3,483,141, granted Dec. 9, 1969, or U.S. patent application Ser. No. 702,399, filed Feb. 1, 1968 the pertinent portions of which are hereby incorporated by reference. Likewise, polymers wherein $n$ is exclusively 3 are prepared by polymerization with a cation-active catalyst, as described in the above-indicated copending applications, of 2-substituted-$\Delta^2$-1,3,4H-oxazines of the structure:

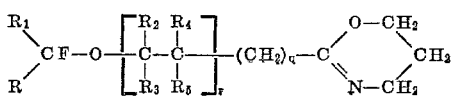

wherein R, $R_1$, $R_2$, $R_3$, $R_4$, $R_5$, $r$ and $q$ are as defined above. When copolymers of structure (I) wherein $n$ is 2 and 3 randomly along the chain are being prepared, a mixture of oxazoline and oxazine monomers is copolymerized using cation-active catalyst.

Either a single oxazine and/or a single oxazoline monomer can be polymerized, or any desired mixture of oxazine and/or oxazoline monomers. Ordinarily no particular advantage accrues from using a mixture of monomers of the same type, i.e., a mixture of oxazine monomers or a mixture of oxazoline monomers. When a random mixture of oxazine and oxazoline monomers is polymerized, the ratio of $n=3$ to $n=2$ polymer units is substantially equivalent to the ratio of oxazine-to-oxazoline monomer in the polymerization charge.

As heretofore indicated, the polymerization of the oxazine and/or oxazoline monomer is effectuated by heating such monomers in the presence of a cation-active catalyst. The term "cation-active catalyst" as used herein connotes materials which are capable of initiating vinyl polymerization by reaction with the double bond of a vinyl monomer through an electron-pair displacement process to thereby create a carbonium ion-reactive site at the end of the resulting polymerizable adduct. Typical catalysts of this type include the strong protonic acids such as sulfuric, hydrobromic and hydriodic, trichlor- and trifluoracetic, perchloric, fluoboric, fluoantimonic, and organic sulfonic acids such as p-toluene-sulfonic, benzene sulfonic, ethane sulfonic, and $\alpha$- and $\beta$-naphthalene sulfonic; Lewis acids (also commonly called Friedel-Crafts reagents because of the widespread use of these compounds in the classical Friedel-Crafts reaction) such as metal halides like aluminum chloride and bromide, boron trifluoride and addition products thereof, boron trichloride, tin and titanium tetrachloride, the pentafluorides and pentachlorides of arsenic and antimony and elementary iodine; and esters and salts of strong acids such as dimethyl and diethyl sulfate, alkyl sulfonates, alkyl bromides and iodides, mixed sulfonic acid-carboxylic acid anhydrides of the general formula: $RSO_2OCOR'$, wherein R and R' are the same or different alkyl, cycloalkyl or aryl groups, triphenylmethyl fluoborate, aryldiazonium fluoborates, and salts of strong acids with oxazolines, and the like. Preferred catalysts are dimethyl sulfate, 2-alkyl or aryl oxazolonium perchlorates, and methyl-p-toluene-sulfonate.

A suitable polymerization temperature ranges from about 20° C. to about 250° C., preferably 80° C. to 200° C.

The amount of catalyst used is not critical and virtually any amount will initiate polymerization. Ordinarily, from 4 to 10,000 mols of monomer per mol of catalyst is used. Preferably, the monomer-to-catalyst mol ratio will be adjusted so as to achieve a degree of polymerization (DP) ranging from about 5 to about 200. The DP desired will, of course, depend upon the particular use desired for the polymer. The DP, of course, corresponds to the number of recurring units of structure (I) in the polymer chain.

Copending applications, commonly assigned, Ser. No. 382,342, filed July 13, 1964, now U.S. Patent No. 3,249,199; Ser. No. 631,194, filed Apr. 17, 1967, now U.S. Patent No. 3,397,231; Ser. No. 655,291, filed July 24, 1967; and U.S. Patents Nos. 3,331,851 and 3,402,178, the pertinent portions of which are hereby incorporated by reference, describe various procedures for the preparation of $\Delta^2$-oxazolines and $\Delta^2$-1,3,4H-oxazines from carboxylic acids.

The preferred preparative method for preparing the oxazine or oxazoline monomers, which are then transformed into the polymers of the instant invention, involves the liquid phase catalytic cyclization, as described in copending, commonly assigned application Ser. No. 655,291 filed July 24, 1967 the pertinent portions of which are hereby incorporated by reference of β- or γ-hydroxyalkyl amides:

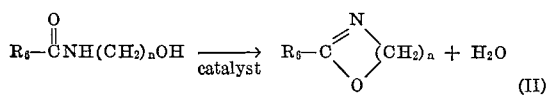

wherein $n=2$ or 3.

Alternatively, such monomers can be prepared by the base-catalyzed cyclodehydrohalogenation of β- or γ-haloalkyl amides:

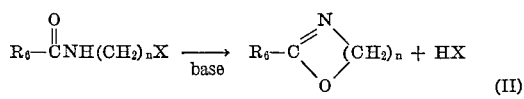

wherein X=chlorine, bromine or iodine; and $n=2$ or 3. The β- or γ-haloalkyl amides are prepared from the β- or γ-hydroxyalkyl amides by replacement of the hydroxyl group with halogen using a halogenation agent such as $PBr_5$ or $SOCl_2$.

Thus, the β- or γ-hydroxyalkyl amides are transformed either directly or through the corresponding β- or γ-haloalkyl amide to the oxazoline or oxazine, respectively. The β- or γ-hydroxyalkyl amides are preferably prepared by reaction of an ω-aminoalkanol with a carboxylic acid:

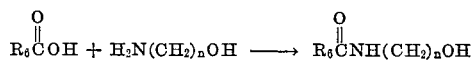

wherein $n=2$ or 3.

The β-haloalkyl amides can also be prepared directly by the following reaction sequence:

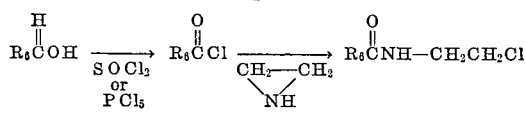

It is thus apparent that if $R_6$ in structure (II)=

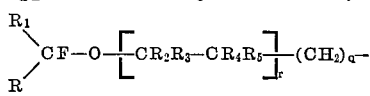

the oxazine and oxazoline monomers of the instant invention can be obtained by any one of several alternative routes from carboxylic acids of the structure:

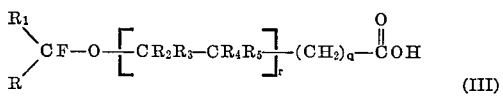

The carboxylic acid precursors of the monomers and the polymers of the instant invention which have the structure:

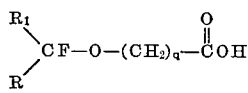

i.e., structure (III) wherein $r=0$, can be prepared in the following manner:

Copending commonly assigned U.S. patent application Ser. No. 492,276 filed Oct. 1, 1965, now U.S. Patent No. 3,453,333, the pertinent portions of which are hereby incorporated by reference, discloses the reaction of ketones of the structure:

wherein R′ and R″ are perhalogenated alkyl groups, wherein the halogen atoms are either fluorine or chlorine, and wherein at least one fluorine atom is attached to each carbon atom, with an ionizable fluoride salt MF to form the organic salt:

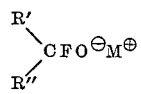

wherein M is potassium, cesium, silver, rubidium, or tetraalkylammonium.

The reaction of the ketone with the fluoride salt takes place readily upon admixture at room temperature in an anhydrous liquid medium which is a solvent or partial solvent for the organic salt:

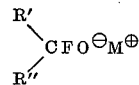

and in which the fluoride salt is ionizable. Suitable liquid media include acetonitrile, nitrobenzene, butyrolactone, dioxane, tetrahydrofuran, diglyme, sulfolanes such as 2-methyl sulfolane and sulfones such as methyl ethyl sulfone and tetramethylene sulfone. The particular medium chosen is not critical as indicated by the fact that suitable solvents, as above indicated, vary substantially in their chemical type. The reaction temperature may suitably be $-50°$ to $+150°$ C., most preferably from a convenience standpoint the reaction is carried out at room temperature.

Preferably about 0.8 to 4.0 mols of fluoride, MF, is used per mol of ketone. Preferably, if M is tetralkylammonium, the compound:

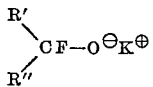

is first prepared and this organic potassium salt, transformed to the desired ammonium salt by a disproportionation reaction with tetraalkylammonium chloride or perchlorate.

By this procedure, starting materials for preparing the carboxylic acids, which, as previously indicated, are transformed into the monomers of the instant invention, can be prepared having the structure:

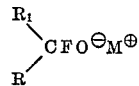

wherein R and $R_1$ are as previously indicated. Suitable ketones for use in the present invention include hexafluoroacetone; α-chloropentafluoroacetone; α,α′-dichlorotetrafluoroacetone; α,α,α′-trichlorotrifluoroacetone; α,α-dichlorotetrafluoroacetone; octafluorobutanone; α-chloroheptafluorobutanone; decafluoro-3-pentanone; 2-trifluoromethyl-3-perfluoropentanone; dedecafluoro-3-hexanone; tetradecafluoro-3-heptanone; perfluoro-4-octanone, etc. The preferred ketone is hexafluoroacetone.

The organic salt:

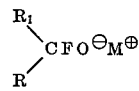

reacts readily with ω-haloalkyl esters, $X(CH_2)_q—COOR_7$, to form the compounds:

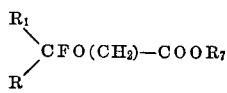

wherein q can suitably range from 1 to 11; $R_7$ is methyl, ethyl, propyl, and the like; and X is chlorine, bromine or iodine. The corresponding acid is produced by saponification of the ester and acidification to thereby replace the $R_7$ group by hydrogen.

By this method, therefore, are prepared the acid precursors of the monomers and the polymers of the instant invention having the structure:

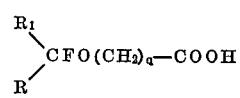

i.e., structure(III), wherein $r=0$.

To prepare the carboxylic acid precursors of structure (III) of the monomers and the polymers of the instant invention wherein $r=1$, a modification of the hitherto-described reaction sequence is utilized. The preparation of such acids is described in copending commonly assigned U.S. patent applications Ser. No. 749,350 filed Aug. 1, 1968, Ser. No. 721,115 filed Apr. 12, 1968 and Ser. No. 721, 117 filed Apr. 12, 1968, the pertinent subject matter of which is hereby incorporated by reference.

The organic salt of the structure:

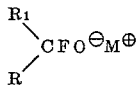

is prepared as previously described. This organic salt is then reacted with an olefin of the structure:

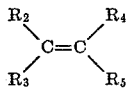

and a halogen other than fluorine or astatine, e.g., chlorine, bromine, iodine, and diatomic interhalogens such as iodine monochloride.

The reaction of the olefin and halogen with the organic salt is as follows:

(IV)

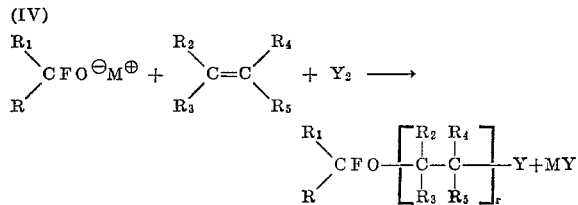

wherein Y=chlorine, bromine or iodine and $r=1$.

The reaction between the fluorinated organic salt, the olefin and the halogen to form a fluorinated ether (IV) proceeds readily at a temperature from $-50°$ C. to $+150°$ C. Most preferably, because of simplicity, the reaction is carried out at room temperature.

As disclosed in copending commonly assigned U.S. patent application Ser. No. 633,359 filed Apr. 25, 1967, now U.S. Pat. No. 3,514,487, the pertinent subject matter of which is herewith incorporated by reference, compounds of the structure:

(IV)

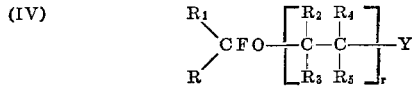

wherein $r$ is greater than 1, are prepared by telomerization of compound (IV), wherein $r=1$. If such telomerization reaction is to be carried out, Y should be either bromine or iodine. Similar fully fluorinated compounds, for example:

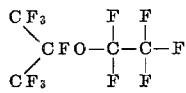

described in U.S. Pat. 2,500,388, will not undergo telomerization.

Compound (IV), wherein $r=1$, hereinafter referred to as a telogen, reacts with telomerizable unsaturated compounds of the structure:

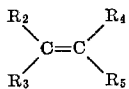

to form a telomer:

(IV)

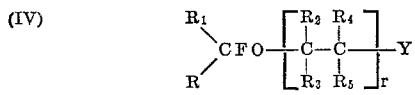

wherein $r=2$. If desired, this compound (IV), wherein $r=2$, can be further telomerized with additional telomerizable unsaturated compound to form the compounds of structure (IV), wherein $r=3$ to 5.

It is thus apparent that telomer (IV), wherein $r=2$, can serve as a telogen for further reaction. The term telogen is used in this sense herein. In other words, the telogen may be a telomer product produced from a precursor telogen, which telomer product is itself further telomerizable by functioning as a telogen.

In general, the reaction between the telogen and the telomerizable unsaturated compound is carried out under free radical conditions. The free radicals are preferably produced by thermal initiation of the reaction and this is accomplished simply by heating the reactants to an elevated temperature. The reaction conditions normally will vary to some extent, depending on the particular reactants and the type of product desired. The temperature should normally be between about 100° C. and 350° C., preferably between about 150° C. and 200° C. Furthermore, although the reaction may be conducted at atmospheric pressure, superatmospheric pressures, for example, up to about 20,000 p.s.i.g. may be used with pressures between about 100 p.s.i.g. and about 10,000 p.s.i.g. being especially preferred. The reaction time is whatever is required to give satisfactory conversions and the optimum reaction time will depend upon the particular reactants employed, on the temperature and on the method of unsaturated compound addition. For example, if the telogen and unsaturated compound are charged initially and heated to a temperature of about 200° C., the reaction is substantially complete in about 3 hours. On the other hand, if portionwise or continuous addition of unsaturated compound is used, for example, the reaction time is dependent upon temperature and the rate of unsaturated compound addition. It is additionally believed that the chain length of the product obtained is influenced by the reaction time at least to a certain extent. Normally, the reaction time may range from about 10 minutes to about 2 weeks, usually from about 1 hour to about 48 hours.

If desired, the reaction between the telogen and the telomerizable unsaturated compound can be conducted by use of a free radical-generating catalyst or light of sufficient intensity to initiate the free radical reaction. Illustrative free radical-generating catalysts include azonitriles such as $\alpha$-,$\alpha'$-azobisisobutyronitrile and organic peroxides such as benzoyl peroxide, acetyl peroxide and pelargonyl peroxide. The use of such free radical generators allows operation at a lower temperature, but sometimes gives a somewhat more complex product mixture because of the incorporation of catalyst fragments in the telomer mixture.

The telomerization reaction may be carried out in various ways. For example, the telogen and the unsaturated compound can be introduced into an autoclave which is then sealed and heated, preferably with agitation such as by stirring or shaking, until the pressure drop indicates that the reaction has proceeded to the desired extent. In such an operation, the molor ratio of unsaturated compound to telogen is of importance in determining the molecular weight, i.e., the value of $r$, of the telomer product. In general, the average molecular weight of the product is dependent upon the molar ratio of unsaturated compound to telogen; the higher the unsaturated compound-telogen molar ratio, the higher will be the average $r$ value of the telomer product. The ratio of telogen to unsaturated compound can vary from about 1:75 to as high as 200:1—the preferred ratio for batchwise operation being about 1:1 to 2:1 in the production of relatively low $r$ value telomers i.e., telomers incorporating up to about 5 unsaturated compound units per telomer molecule. On the other hand, in a constant pressure reaction, i.e., where a constant pressure of unsaturated compound is maintained above the liquid phase comprising the telogen during the reaction, the molecular weight of the telomer product can be controlled by varying the pressure of the unsaturated compound. In general, the higher the pressure of the unsaturated compound, the higher the $r$ value of the teleomer product.

The telomerization reaction inherently tends to produce a mixture of telomers of varying $r$ values; however, the average $r$ value produced by the telomerization reaction can be controlled within limits, as discussed above, by varying the reactant proportions, reaction time, reaction time, reaction temperature, reaction pressure, and other reaction variables. If desired, individual telomer products, i.e., a telomer of given $r$ value, can be separated from mixtures thereof with higher $r$ value telomers by conventional separatory techniques, for example, by fractional distillation or by fractional crystallization using an inert solvent such as diethyl ether. If desired, the fractions of low $r$ value can be recycled.

Suitable telomerizable unsaturated compounds of the structure:

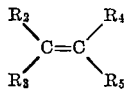

for use in the instant invention include, for example,

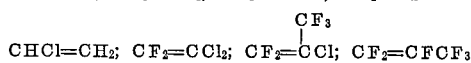
and

The preferred telomerizable unsaturated compound is $CF_2=CF_2$.

(IV) 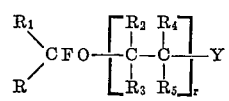

wherein $r=1–5$, into carboxylic acids of the structure:

(V) 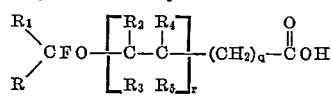

wherein $q=0–11$, can be carried out by any of several methods depending upon the desired value of $q$. To prepare the compound (V), wherein $q=0$, compound (IV) can be reacted with a Grignard reagent, e.g., phenyl magnesium iodide, to form a magnesium halide adduct, this adduct reacted with $CO_2$ to form a magnesium halide salt, and this salt then acidified. The reaction sequence which is described in copending applications Ser. No. 492,276 filed Oct. 1, 1965, now U.S. Patent. No. 3,453,333 and Ser. No. 513,574 filed Dec. 13, 1965, now U.S. Patent No. 3,370,256, the pertinent portions of which are hereby incorporated by reference is as follows:

(VI)

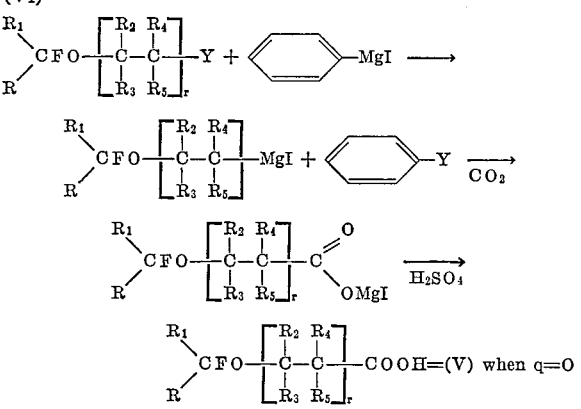

The reactions involving the Girgnard reagent and the carbon dioxide proceed very rapidly and can be conducted at temperatures considerably below 0° C. It is desirable that both of these reactions be conducted at temperatures less than 0° C. in order to better control the reaction rates and prevent decomposition of the Grignard reagent.

As an alternative to the use of the Grignard reaction, the compound:

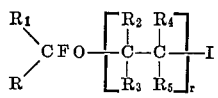

can be reacted with alkali metal cyanide to give:

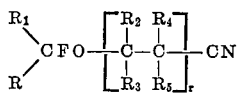

in those cases wherein the $R_2$, $R_3$, $R_4$, and $R_5$ groups in the

moiety adjacent to the iodine being replaced by CN are not fluorine or trifluoromethyl. This cyano compound can then be hydrolyzed to the desired carboxylic acid (V), wherein $q=0$, by known methods.

The carboxylic acids of the formula:

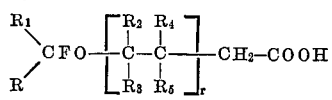

i.e., acids of Formula V, wherein $q=1$, can be prepared by reacting telomer of structure (IV) with allyl alcohol at temperatures ranging from about 100°–450° C., preferably 150°–300° C., under superatmospheric pressure to form a compound of the structure:

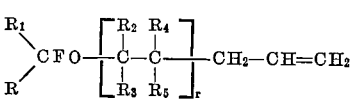

followed by oxidation of the compound with permanganate or dichromate to cleave the double bond and form the desired compound:

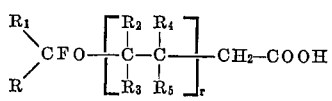

i.e., acid (V), wherein $q=1$. An example of such synthetic method is described in Examples 5 and 6 of copending, commonly assigned U.S application Ser.. No. 721,117 filed Apr. 12, 1968, the pertinent portions of which are hereby incorporated by reference.

Finally, the carboxylic acids having the structure:

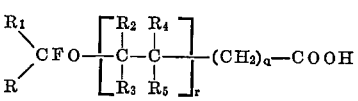

wherein $q=2–10$, are prepared by the following reaction sequence between telomer (IV), wherein Y=iodine, and terminally unsaturated carboxylic ester:

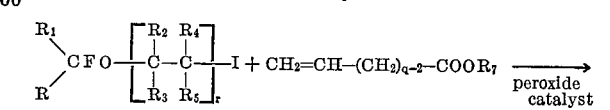

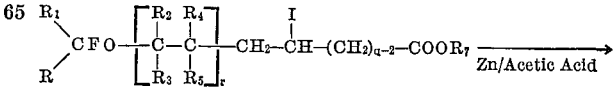

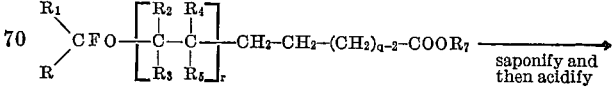

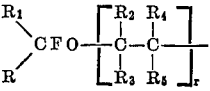

The peroxide-catalyzed reaction of telomer (IV) with terminally unsaturated carboxylic acid takes place under temperature and other reaction conditions substantially identical to those hitherto described as suitable for the aforementioned telomerization reaction.

The treatment of fibrous webs such as cloth, paper, felt, and the like, as well as less porous substrates such a wood, with the polymer of the instant invention to render them water and oil repellant can be carried out by any of a number of conventional methods. Ordinarily, the polymer is dissolved in a comparatively low boiling organic solvent such as fluorodichloromethane, difluorodichloroethane, trifluoroethanol, cyclohexanone, dichlorobenzene, trifluoromethyl benzene, ethyl acetate, methyl ethyl ketone, hexane, amyl acetate, carbon tetrachloride, methanol, or chloroform, and the polymer solution then painted or sprayed onto the chosen substrate. Thereafter, the solvent can be evaporated from the substrate at ambient or above ambient temperature. The substrate will be found to have a firmly adhering surface coating of the polymer. Additionally, depending upon the porosity of the substrate, it will be impregnated with a greater or lesser amount of the polymer. Alternatively, and preferably, in the case of fibrous webs, particularly fabric, the fabric may be dipped into a bath of the polymer solution, removed, and the solvent allowed to evaporate. The thereby-treated substrate shows good water and oil repellency. Ordinarily from about 0.5 to 10% by weight of the polymer will be found to adhere to the fabric, which is sufficient to impart the desired repellancy, although greater or lesser amounts of polymer will be desirable in particular instances.

The following specific examples further illustrate our invention. Examples 1–10 describe the preparation of representative members of the class of monomers and polymers of the instant application. Examples 11 and 12 show the critical surface energies and oil- and water-repellency properties of these and other polymers as described and claimed in the instant invention.

Example 1.—Preparation of 2-(1-perfluoroisopropoxy methyl)oxazoline

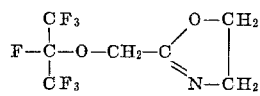

This compound was prepared by the following sequence of reactions:

(A)

$BrCH_2COOC_2H_5 + F-\overset{CF_3}{\underset{CF_3}{C}}-O-K^+ \longrightarrow$ $F-\overset{CF_3}{\underset{CF_3}{C}}-O-CH_2COOC_2H_5 + KBr$ A solution of hexafluoroacetone-potassium fluoride adduct in 300 ml. of acetonitrile was prepared using 50 grams of the acetone (0.3 mol) and 20.9 grams of the fluoride (0.36 mol) by passing the acetone into a mixture of the fluoride and acetonitrile. Such adducts or ionizable metal organic salts are described in copending application Ser. No. 492,276 filed Oct. 1, 1965, now U.S. Patent No. 3,453,333. 33.4 grams of ethyl bromoacetate dissolved in 100 ml. of acetonitrile was then added dropwise with stirring at room temperature to the adduct solution. No visible reaction was noted. The reaction mixture was then heated to about 70° C. for 3 to 4 hours.

Analysis of a sample of the reaction mixture by gas chromatography showed about 80% of the desired product.

Continuing the reaction with stirring for about 24 hours, showed a product content of about 92.5% by gas chromatography analysis.

Product was recovered by cooling the reaction mixture in an ice-water bath and mixing in a solution of 0.2 mol of sodium carbonate in 400 ml. of cold water. The organic layer was separated and washed twice with water, dried over anhydrous sodium sulfate, filtered, and subjected to distillation using a spinning band column.

36 grams of clear, colorless liquid having a sweet odor was obtained at 59°–60° C. at 36–37 mm. of Hg pressure.

The aqueous layers were combined and extracted with methylene chloride; then this extract dried overnight over anhydrous sodium sulfate, filtered, and fractionally distilled. A fraction amounting to 2.44 grams was obtained at 54° C. at 34 mm. of Hg.

Analysis of this and of the major distillate by gas chromatography and infrared analyses showed them to be 96.4% pure ethyl-2-perfluoroisopropoxy acetate.

(B)

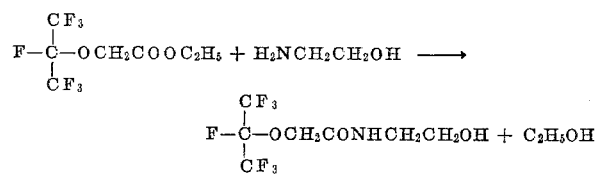

27.2 grams of ethyl-2-perfluoroisopropoxy acetate (0.10 mol) and 6.7 grams of ethanolamine were placed in a 250-ml., three-necked flask fitted with a mechanical stirrer, heating mantle, thermometer, and a distillation column with a take-off head. The mixture was then heated to drive off the ethanol reaching a final temperature of 175° C. About 4 ml. of ethanol was collected. The mixture was then distilled under vacuum through a short Vigreaux column. Two fractions were taken: one amounting to 2.64 grams distilling at 100°–101° C. at 0.5 mm. Hg and the other amounting to 16.86 grams distilling at 101°–105° C. at 0.50–1.2 mm. Hg. The fractions were clear colorless and very viscous liquids having $n_D^{25° C.}$ values of 1.3742 and 1.3732 respectively.

Analysis of the fractions by infrared showed them to be the desired N-(β-hydroxyethyl)perfluoroisopropoxy acetamide.

Elemental analysis showed: Found (percent): C, 29.1; H, 3.07. Theory (percent): C, 29.3; H, 2.81.

(C)

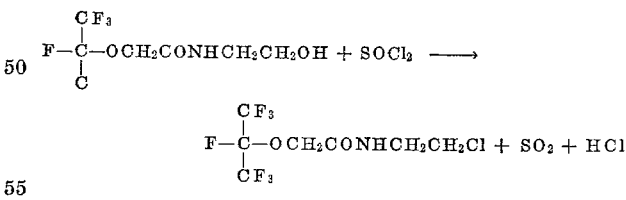

A 500-ml., three-necked flask fitted with a mechanical stirrer, dropping funnel, heating mantle, immersion thermometer and a water-cooled condenser having a tube to an exit gas trap charged with 150 g. (0.52 mol) of N-(β-hydroxyethyl)perfluoroisopropoxy acetamide. Then, 109 g. (0.92 mol) of thionyl chloride was added dropwise to this with stirring. The temperature of the mixture rose to about 52° C. After the addition of the thionyl chloride was completed, the reaction mixture was heated to 85° C. and stirred for ½ hour. The resultant mixture was then treated to remove the excess SOCl₂ by first subjecting it to vacuum in a rotary evaporator without heat and then heating at 40°–45° C. The remaining material (155 g.) was vacuum distilled in two batches: 48.6 g. and 96.4 g. 38.09 grams of reddish brown oil distilling at 75°–77° C. at 2–3 mm. of Hg was obtained from the first and 73.79 g. of similar product at 71°–76° C. at 1 mm. of Hg from the second. 112 grams of the N-(β-chloroethyl)perfluoroisopropoxy acetamide was obtained.

Infrared analysis showed it to be the desired product.

Elemental analysis showed: Found (percent): C, 27.4; H, 2.32; Cl, 11.8. Theory (percent): C, 27.5; H, 2.31; Cl, 11.6.

(D)

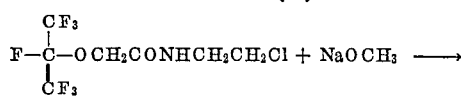

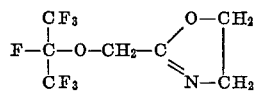

Fifty milliliters of anhydrous methanol was placed in a 100-ml. one-necked, round-bottom flask fitted with a drying tube. 1.05 grams of sodium was then dissolved in the methanol and 13.94 g. of N-(β-chloroethyl)perfluoroisopropoxy acetamide added. A precipitate of sodium chloride appeared at once. The reaction mixture was then heated at reflux ½ hour, cooled, and the NaCl removed by filtration. The solution was then distilled. After removal of the methanol, 9.23 g. of clear, colorless liquid was obtained at 70°–71° C. at about 30 mm. Hg. This was 2-(perfluoroisopropoxy methyl)oxazoline as shown by infrared analysis.

Elemental analysis was: Found (percent): C, 31.2; H, 2.31. Theory (percent): C, 31.2; H, 2.25.

Example 2.—Polymerization of 2-(perfluoroisopropoxy methyl)oxazoline to poly - [N - (perfluoroisopropoxy acetyl)ethyleneimine]

A thick-walled glass tube of about 20-ml. capacity was first rinsed with glacial acetic acid, then with diethyl ether, and the ether evaporated by attachment of the tube to a high vacuum line. Then, 4.23 grams of a solution of parachlorophenyl oxazolinium perchlorate catalyst containing 0.026 g. ($9.3 \times 10^{-5}$ mol) of the catalyst was placed in the tube. After addition of this solution, the tube was immersed in an ice bath and the acetonitrile evaporated by attaching the tube to a high vacuum line containing a stopcock. After removal of the solvent, 5 g. (0.0186 mol) of 2-(perfluoroisopropoxy methyl)oxazoline was added to the tube and the tube and its contents degassed twice by immersing it in a Dry-Ice acetone bath and applying and releasing vacuum. The stopcock was then closed, the tube allowed to warm up to room temperature and then sealed at the vacuum line attachment. The tube was then heated at 80° C. An increase in viscosity of the contents was noted in ½ hour. The contents became crystalline after 1 hour, and heating was continued at 120° C. for 1 hour. An orange-colored, crystalline-appearing polymer was obtained. The monomer-to-catalyst ratio was 200:1. The polymer had a reduced viscosity of 0.07 as measured in a 0.5% solution in 2-trifluoroethanol.

Evaluation by differential thermal analysis at a heating rate of 10° C./min. under nitrogen showed two melting points: 182° C. and 193° C., indicating two crystalline forms. The main exotherm peak was at 290° C. X-ray analysis proved it to be a crystalline material.

A second polymerization was carried out in a similar manner, except that the 2-(1-perfluoroisopropoxy methyl)oxazoline from a synthesis preparation was redistilled with a 24-in. long spinning band column and a fraction obtained at 72°–72.5° C. at 32 mm. Hg pressure distilled directly into the polymerization tube. 17.34 grams (0.0645 mol) was used with 3.37 grams of the acetonitrile solution of parachlorophenyl oxazolinium perchlorate containing $2.213 \times 10^{-5}$ mol per gram. Mols of catalyst were $7.45 \times 10^{-5}$, and the ratio of monomer to catalyst was 866:1. Polymerization was carried out by heating at 80° C. for 16 hours and then for 7 hours at 100° C.

The product was a pale yellow, soft solid. It had a reduced viscosity of 0.07 as determined with a 1% solution in 2-trifluoroethanol. The polymer was soluble in cyclohexanone and dichlorobenzene.

Example 3.—Preparation of 2-(10-perfluoroisopropoxy decyl)oxazoline

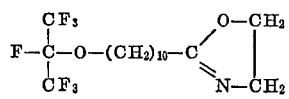

This compound was prepared by the following sequence of reactions:

(A)

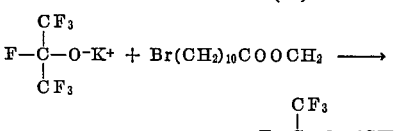

A solution of hexafluoroacetone-potassium fluoride adduct in acetonitrile was prepared as previously described using 18.3 g. of the acetone (0.11 mol) and 6.4 g. of the fluoride (0.11 mol) and 200 ml. of acetonitrile. To this was added, with stirring, 27.9 g. (0.10 mol) of methyl-ω-bromoundecanoate and heating begun. The temperature reached an equilibrium value of about 70° C. at 1 atm. pressure. After about 48 hours of reaction, a sample showed about 40% product and 60% starting material by gas chromatographic analysis. The reaction mixture was then filtered and the filtrate diluted with enough acetonitrile to bring up the volume to about 400 ml. Then 11.62 g. (0.20 mol) of potassium fluoride, 33.2 g. (0.20 mol) of hexafluoroacetone and 27.9 g. (0.1 mol) of bromoester were added. This mixture was then heated and stirred under autogenous pressure at about 135° C. and 60 p.s.i. for about 20 hours. Analysis by gas chromatography showed essentially only methyl-11-perfluoroisopropoxy undecanoate. The potassium bromide was removed by filtration and filtrate distilled. After removal of the volatiles, a major fraction was obtained at reduced pressure. Sixty grams of the major fraction was redistilled to give 47.96 g. of a fraction distilling at 98° C., at about 0.4 mm. Hg. This was the desired product as shown by infrared and elemental analyses.

Found (percent): C, 47.1; H, 6.0; F, 34.5. Theory (percent): C, 46.9; H, 5.99; F, 34.6.

(B)

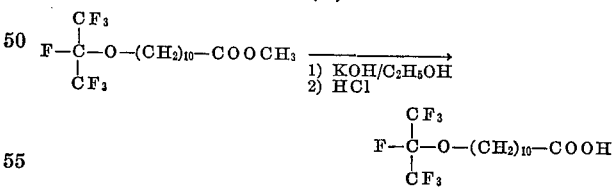

72 grams of methyl-11-perfluoroisopropoxy undecanoate (0.187 mol) and an 80% aqueous ethanol solution containing 28 grams of potassium hydroxide were heated at reflux for 4 hours, the resulting solution cooled, diluted with water, and extracted with methylene chloride to remove unreacted ester. The aqueous solution was then acidified with hydrochloric acid to give a white oily solid. This was extracted with chloroform and the chloroform solution dried over anhydrous calcium chloride. After the chloroform was removed by distillation, 63 g. of oil was obtained. This oil was then fractionally distilled to give 60 g. of solid material having a boiling point of 112°–115° C. at 0.08 mm. Hg. This was 11-perfluoroisopropoxy undecanoic acid as shown by a neutral equivalent of 374; theoretical is 370. The structure was confirmed by infrared spectrum.

Elemental analysis was: Found (percent): C, 46.7; H, 5.91. Theory (percent): C, 45.4; H, 5.68.

(C)

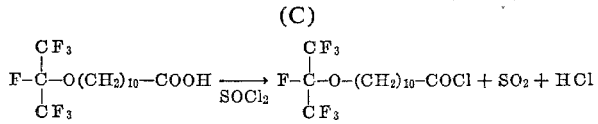

21.2 grams (0.18 mol) of thionyl chloride was placed in a 250-ml., three-necked flask fitted with a magnetic stirrer, reflux condenser, thermometer and dropping funnel. The thionyl chloride was heated to reflux and 40 g. (0.09 mol) of 11-perfluoroisopropoxy undecanoic acid added over a period of about 40 minutes. The mixture was heated at reflux for 1 hour, then subjected to distillation at atmospheric pressure to remove excess $SOCl_2$. When the pot temperature reached 160° C., distillation of the $SOCl_2$ was discontinued and the residual liquor distilled at a pressure of 0.1 mm. Hg. There was obtained 36.2 grams of material distilling at 88°–89° C., and a minor amount of slightly higher boiling fraction distilling up to 91.5° C.

Infrared spectrum showed this to be the desired 11-perfluoroisopropoxy undecanoyl chloride.

Elemental analysis showed: Found (percent): C, 43.2; H, 5.2; Cl, 9.0. Theory (percent): C, 43.3; H, 5.2; Cl, 9.1.

Additional product (68 g.) was also prepared by a similar procedure.

(D)

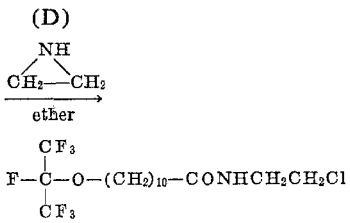

37.4 grams (0.0965 mol) of 11-perfluoroisopropoxy undecanoyl chloride in 150 ml. of diethyl ether and 4.2 grams (0.098 mol) of ethyleneimine dissolved in 50 ml. of diethyl ether were reacted by addition of the imine solution to the acid chloride solution over a period of about 1 hour. Hydrogen chloride gas was then passed into the reaction mixture for less than 1 minute and 1.5 grams of solid removed by filtration. Evaporation of the ether gave 38 g. of solid product whose infrared spectrum and elemental analysis showed it to be N-($\beta$-chloroethyl)-11-perfluoroisopropoxy undecanamide.

Analysis showed: Found (percent): C, 44.3; H, 5.8. Theory (percent): C, 44.5; H, 5.8.

(E)

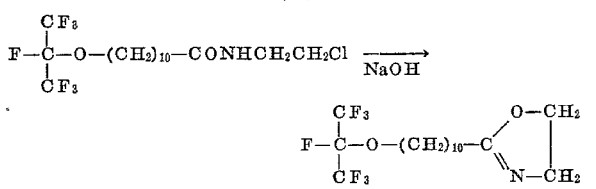

The N-($\beta$-chloroethyl)-11-perfluoroisopropoxy undecanamide obtained in the preceding example was dissolved in 50 cc. of isopropanol. 22 cc. of this solution containing 17 grams (0.043 mol) of the undecanamide was then added to a solution of 1.6 g. (0.04 mol) of sodium hydroxide which had been prepared by stirring and heating of the caustic with the alcohol. Addition of the chloroamide solution gave a white precipitate. After stirring for 2 minutes, 2.5 g. of this precipitate was removed by filtration. The solution was then subjected to a flash evaporation to give 18 grams of a white, gel-like residue. This was taken up in petroleum ether and 1.9 g. of solid filtered off. The filtrate was then flash evaporated at 58° C. and 5 mm. Hg to give 14.5 g. of oily liquid. The latter was distilled with a 24-in. spinning band column, and 10.5 g. of product obtained at 72°–73° C. at 0.02 mm. Hg. This was redistilled to give a major fraction amounting to about 7 grams which distilled at 84°–85° C. at 2 mm. Hg.

The infrared spectrum and elemental analysis were consistent with the structure for 2-(10-perfluoroisopropoxy decyl)oxazoline.

Elemental analysis was as follows: Found (percent): C, 48.3; H, 6.1. Theory (percent): C, 48.6; H, 6.1.

Example 4.—Polymerization of 2-(10-perfluoroisopropoxy decyl)oxazoline to N-(11-perfluoroisopropoxy undecanoyl)polyethyleneimine A polymerization tube was charged in a manner similar to that used in the preceding example with 0.00427 g. ($1.5 \times 10^{-5}$ mol) of parachlorophenyl oxazolinium perchlorate using and removing acetonitrile solvent and with 7 g. ($17.7 \times 10^{-3}$ mol) of 2-(10-perfluoroisopropoxy decyl)oxazoline. The monomer-to-catalyst ratio was 1180:1. This catalyzed oxazoline was then heated to 110° C. It became a viscous liquid in 3½ hours. The temperature was then increased to 120° C. and maintained at this temperature for 15½ hours. It was then lowered to 100° C. over a period of 1 hour, then to 75° C. over a period of 1 hour. The reaction mixture was still a viscous liquid. Finally, the temperature was lowered to 50° C. over a 2½-hour period to give a colorless solid, soft product. It was soluble in trifluoromethyl benzene, ethyl acetate, and partially soluble in 2-trifluoroethanol. The reduced viscosity was 0.40 as determined in a 1.42 g./100 cc. solution in trifluoromethyl benzene.

Evaluation by differential thermal analysis showed a melting range of 85°–90° C. with decomposition at about 335° C. The material crystallized from the melt at about 55° C.

Example 5.—Preparation of 2-(4,4,5,5-tetrafluoro-5-perfluoroisopropoxy pentyl)oxazoline (A)

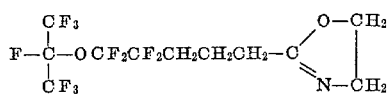

This compound was prepared by the following sequence of reactions:

(A)

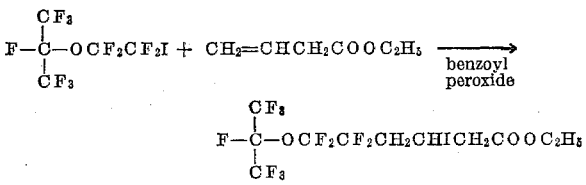

The ethyl ester was prepared in conventional manner by reaction of 3-butenoic acid with anhydrous ethanol in the presence of sulfuric acid. It was essential to remove all of the acid catalyst at the end of reaction by washing with water. Otherwise, isomerization of the ethyl-3-butenoate to ethyl-2-butenoate took place during distillation in obtaining the product. The iodo ether was prepared according to the procedure disclosed in copending U.S. application Ser. No. 492,276 filed Oct. 1, 1965. The latter shows reaction of hexafluoro-acetone-potassium fluoride to form perfluoroisopropoxy anion and reaction of this with tetrafluoroethylene in the presence of iodine.

56 grams (0.5 mol) of redistilled ethyl ester, 250 g. (0.6 mol) of the iodo ether compound and 2.5 g. (ca. 0.01 mol) of benzoyl peroxide were mixed together and the solution warmed and treated with a slow stream of nitrogen for about 30 minutes. It was then heated at 95° C. for 1½ hours, cooled, and 3 g. more of benzoyl peroxide added. It was then heated at 95° C. for 4 hours, cooled, 2 grams more of benzoyl peroxide added, and then heated for 2 hours.

Gas chromatographic analysis of a sample showed no presence of the ester. The reaction mixture was then fractionally distilled under reduced pressure. After removal of unreacted iodo ether and an interim fraction, there was obtained 173 g. of product at 61°–74° C. at 0.2–0.05 mm. Hg. This was shown to be mainly the desired ethyl-3-iodo - 5,5,6,6 - tetrafluoro - 6 - perfluoroisopropoxy hexanoate.

Elemental analysis showed: Found (percent): C, 24.9; H, 1.9; I, 24.7. Theory (percent): C, 25.1; H, 1.9; I, 24.1.

(B)

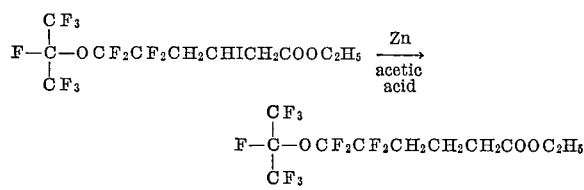

173 grams (0.33 mol) of ethyl-3-iodo-5,5,6,6-tetrafluoro-6-perfluoroisopropoxy hexanoate was reduced in 1200 ml. of glacial acetic acid using 60 g. (0.9 mol) of Zn dust over a period of 3 hours at reflux; then, the mixture was cooled and allowed to stand overnight. It was then poured into water to allow separation of the organic phase. The latter was removed and washed with water to give 114 g. of product. The aqueous phase and water washes were then extracted twice with 100 ml. of methylene dichloride; the solution thus obtained was dried with anhydrous magnesium sulfate and the dried solution distilled to remove the solvent. There was obtained 20 grams of residue, which was washed twice with water to give a final product via the extraction of 12 grams.

Infrared analysis of the original 114 grams obtained and of the 12 grams extract were very similar and showed them to be ethyl-5,5,6,6-tetrafluoro-6-perfluoroisopropoxy hexanoate.

Elemental analysis showed: Found (percent): C, 32.6; H, 2.7. Theory (percent): C, 33.0; H, 2.7.

(C)

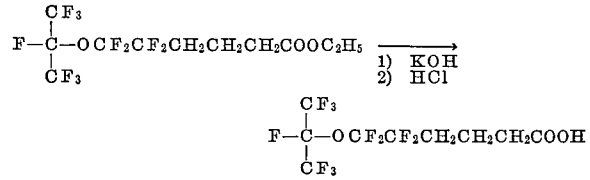

119 grams of ethyl-5,5,6,6-tetrafluoro-6-perfluoroisopropoxy hexanoate was added to a solution of 30 grams of potassium hydroxide in 150 cc. of water and the mixture heated slowly to 95° C. with stirring. The suspension became clear and foamed in about 20 minutes when it was cooled slowly. The resulting solution was then acidified to a pH of 2 with concentrated hydrochloric acid with cooling, which resulted in the precipitation of an organic phase. This was separated. The aqueous layer was then extracted twice with methylene chloride and the extracts added to the organic phase. The solution thus obtained was dried by means of distilling with a Dean-Stark trap to remove about 5 cc. of water and the methylene chloride then removed by distillation to give a residual pale yellow liquid. This was fractionally distilled at a reduced pressure to give a major fraction of 82 grams, distilling at 78°–81° C. at 0.1 mm. Hg. This was shown to be 5,5,6,6-tetrafluoro-6-perfluoroisopropoxy hexanoic acid by infrared spectrum and elemental analysis.

Elemental analysis showed: Found (percent): C, 29.4; H, 1.1. Theory (percent): C, 29.1; H, 1.9.

(D)

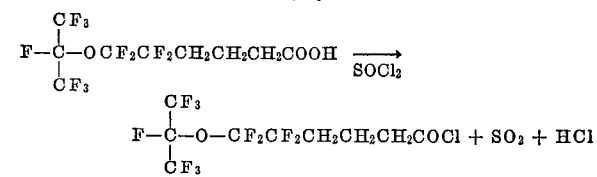

Fifty grams (0.42 mol) of thionyl chloride was placed in a 250-ml., three-necked flask fitted with a magnetic stirrer, reflux condenser thermometer, and dropping funnel. The thionyl chloride was heated to reflux and 80 g. (0.216 mol) of 5,5,6,6-tetrafluoro-6-perfluoroisopropoxy hexanoic acid added over a period of 40 minutes. Refluxing was continued for 10 minutes, and the solution allowed to cool. It was then subjected to fractional distillation; first, at atmospheric pressure to remove excess $SOCl_2$ and low boilers; then, at 0.1 mm. Hg, when a major fraction of a colorless liquid (79 g.) distilling at 50°–51° C. gave a product. Infrared spectrum showed this to be the desired 5,5,6,6-tetrafluoro-6-perfluoroisopropoxy hexanoyl chloride.

Elemental analysis showed: Found (percent): C, 27.5; H, 1.4. Theory (percent): C, 27.6; H, 1.5.

(E)

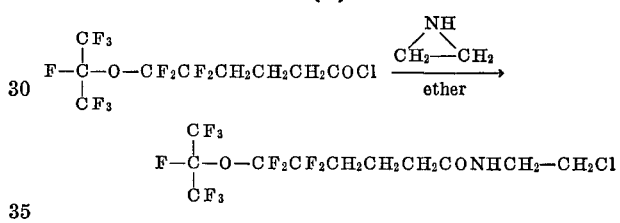

Eighty grams (0.205 mol) of 5,5,6,6-tetrafluoro-6-perfluoroisopropoxy hexanoyl chloride dissolved in a small amount of diethyl ether and 9.4 g. (0.218 mol) of ethyleneimine dissolved in about 100 ml. of diethyl ether were reacted by addition of the imine solution to the acid chloride solution over a period of about 30 minutes with stirring. The reaction mixture was then stirred for 10 minutes and finally anhydrous hydrogen chloride passed slowly into the solution for about 3 minutes. A small amount of white solid separated (2 grams) which was removed by filtration. The resulting clear solution was flash-evaporated to give 87 g. of a pale yellow, semi-solid product.

Infrared spectrum showed this to be N-(β-chloroethyl) 5,5,6,6-tetrafluoro - 6 - perfluoroisopropoxy hexanamide. When recrystallized from diethyl ether, it had a melitng point of 33.7°–34.5° C.

Elemental analysis showed: Found (percent): C, 30.3; H, 2.7. Theory (percent): C, 30.5; H, 2.5.

(F)

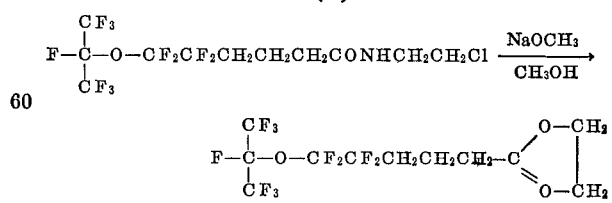

5.1 grams (0.220 mol) of sodium was dissolved in methanol, the solution of methylate thus obtained cooled and 87 g. (0.200 mol) of N-(β-chloroethyl) - 5,5,6,6-tetrafluoro - 6 - perfluoroisopropoxy hexanamide dissolved in methanol added. The total mount of methanol used was 30 ml. Then, the mixture was stirred for 15 minutes. No precipitate formed, so it was heated to reflux with formation of precipitate. Refluxing was continued for 35 minutes; then the solution was cooled and 10 g. of white precipitate (NaCl) was removed by filtration. The ether solution was then flash-evaporated to remove the ether and 78 g. of residue obtained. This was fractionally distilled to give 67 g. of clear, colorless liquid distilling at 56°–58 C. at 0.5 mm. Hg. The infrared and nuclear magnetic resonance spectra showed this to be mainly the desired 2-(4,4,5,5 - tetrafluoro-5-perfluoroisopropoxy pentyl)oxazoline.

Elemental analysis showed: Found (percent): C, 33.6; H, 2.5. Theory (percent): C, 33.2; H, 2.5.

Example 6.—Polymerization of 2-(4,4,5,5-tetrafluoro-5-perfluoroisopropoxy pentyl)oxazoline to poly-[N-(5,5,6,6 - tetrafluoro - 6 - perfluoroisopropoxy hexanoyl) ethyleneimine]

The product obtained in the synthesis of oxazoline was fractionally redistilled to obtain a pure material for polymerization. One fraction obtained at a distillation temperature of 40° C. at 0.1 mm. Hg pressure was polymerized. The procedure used was to charge a cleaned and dried polymerization tube with 2.1 g. of a solution of parachlorophenyl oxazolonium perchlorate in acetonitrile containing 2.213 millimol catalyst per gram of solution and evaporate the acetonitrile by application of vacuum giving a catalyst charge of $46.4 \times 10^{-3}$ millimols. 7.9 grams ($20 \times 10^{-3}$ mol) of the oxazoline was then added to the tube and after degassing and sealing the tube was heated for 5 hours at 100°–120° C. The monomer-to-catalyst ratio was 430:1. A pale yellow, soft solid polymer was obtained. Differential thermal analysis gave a melting point of 133° C.

Another fraction of the redistilled product, which was obtained at a temperature of 49° C. at 0.5 mm. Hg pressure, was redistilled and a fraction obtained at 63.5°–66° C. at 2.0 mm. Hg pressure was polymerized using 6.60 g. of a parachlorophenyl oxazolonium perchlorate catalyst acetonitrile solution containing $1.53 \times 10^{-5}$ mol catalyst per gram of solution and 28 g. (0.071 mol) of the oxazoline. Monomer-to-catalyst ratio was 700:1. The polymerization procedure used was similar to that previously employed using a temperature of 100° C. and heating for 18 hours. The product obtained was a pale yellow, soft solid having a reduced viscosity of 0.25 as a 1.4% solution in 2-trifluoroethanol. X-ray analysis showed it to be a crystalline material. Melting point was 150° C. by differential thermal analysis with decomposition above 40° C. The polymer was soluble in ethyl acetate, methyl ethyl ketone, trifluoromethyl benzene and 2-trifluoroethanol.

Example 7.—Preparation of 2-(11,11,12,12-tetrafluoro-12-perfluoroisopropoxy dodecyl)oxazoline

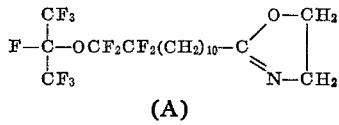

(A)

This compound was prepared by the following sequence of reactions:

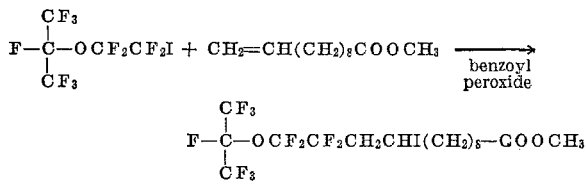

The methyl ester was obtained from Eastman Kodak and purified by distillation at reduced pressure. The iodo ether was prepared according to the procedure disclosed in U.S. Ser. No. 492,276 filed Oct. 1, 1965, now U.S. Pat. No. 3,453,333. The latter shows formation of a hexafluoroacetone - potassium fluoride adduct and reaction of this with tetrafluoroethylene in the presence of iodine.

305 grams (0.73 mol) of the iodo-ether compound, 130 g. (0.67 mol) of the methyl ester and 8.0 g. (0.033 mol) of benzoyl peroxide were mixed together and the mixture heated for 5 hours at 90°–100° C. There was a sudden rise in temperature to 150° C. at about 2.5 hours of heating time and required cooling to maintain the 90°–100° C. temperature. Vapor chromatographic analysis showed there was no remaining undecenoate. This reaction mixture was then fractionally distilled. The major portion of distillate obtained amounted to fractions totaling 341 grams and having a boiling point of 124°–126° C. at 0.3 mm. Hg. The infrared spectrum showed this to be the methyl-10-iodo-12,12,13,13-tetrafluoro-13-perfluoroisopropoxy tridecanoate.

Analysis showed: Found (percent): C, 34.1; H, 3.7; I, 21.1. Theory (percent): C, 33.4; H, 3.6; I, 20.8.

(B)

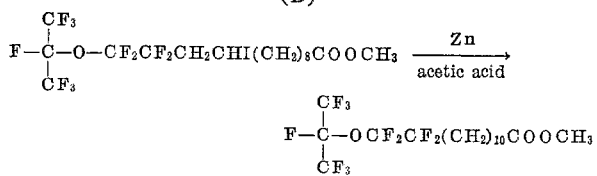

Two liters of glacial acetic acid was taken and heated to just below the boiling point (ca. 115° C.). The 315 grams (0.525 mol) of methyl-10-iodo-12,12,13,13-tetrafluoro - 13 - perfluoroisopropoxy tridecanoate added dropwise at a rate of 80 cc. per hour. 64 grams (1.0 mol) of zinc dust was then added to the ester solution in about 9-gram portions over a period of 140 minutes. The resulting mixture was then heated at reflux for 2 hours. After cooling to room temperature, solid material was removed by filtration and the filtrate poured into 2 liters of water causing settling out of an organic phase. This was separated and washed twice with 1 liter of water. 230 grams of a brown liquid was obtained. This liquid was then fractionally distilled at reduced pressure giving a major portion of the material amounting to 191 grams distilling at 84°–85° C. at 0.08 mm. Hg. The infrared and elemental analyses showed this to be methyl-12,12,13,13-tetrafluoro - 13 - perfluoroisopropoxy tridecanoate.

Analysis was: Found (percent): C, 42.3; H, 4.7. Theory (percent): C, 42.1; H, 4.8.

(C)

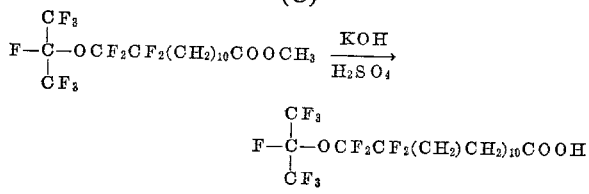

Thirty-five grams (0.625 mol) of potassium hydroxide was dissolved in 350 ml. of water and 180 grams (0.374 mol) of methyl-12,12,13,13-tetrafluoro-13-perfluoroisopropoxy tridecanoate added. The mixture was then heated to 100° C. There was considerable foaming after 20 minutes showing that hydrolysis was taking place, but the mixture did not become homogeneous. After heating for 1½ hours, the mixture was acidified with sulfuric acid. A white, waxy solid precipitated which was removed wet with water by filtration. Fifty grams of this wet, waxy solid was taken and extracted with methylene chloride. There was obtained 14 grams of insoluble material, 14 grams of water and the methylene chloride extract; then the insoluble portion was extracted again with methylene chloride still leaving 10 grams of methylene chloride insoluble material. Evaporation of the methylene chloride extracts gave 17 grams of a liquid which solidified upon cooling. The remainder of the original wet precipitate was extracted with hot methylene chloride to yield 70 grams of water, 10 grams of insolubles and 120 grams of liquid upon removal of the methylene chloride. This liquid became solid on standing. The insoluble solids obtained in both extractions were combined and treated with warm dilute sulfuric acid to convert any salt to acid and the acid solution extracted with warm methylene chloride.

Evaporation of this extract gave 15 grams of liquid which became solid. The combined materials which were methylene chloride soluble, i.e., liquid upon removal of the solvent and becoming solid on standing, amounted to 152 grams. Purification of a sample of this by low temperature crystallization from chloroform gave a product having a melting point of 30°–32° C. The infrared and elemental analyses showed it to be the desired 12,12,13,13-tetrafluoro-13-perfluoroisopropoxy tridecanoic acid.

Analysis was: Found (percent): C, 41.0; H, 4.5. Theory (percent): C, 40.9; H, 4.5.

(D)

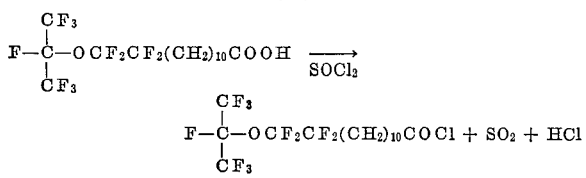

Thirty-eight grams (0.320 mol) of thionyl chloride was dissolved in 30 cc. of chloroform and the solution heated to 50° C. Then 130 grams (0.277 mol) of 12,12,13,13-tetrafluoro-13-perfluoroisopropoxy tridecanoic acid dissolved in chloroform was added slowly over a period of 40 minutes. Hydrogen chloride and sulfur dioxide were evolved. The reaction mixture was then heated at reflux for 40 minutes until no more gas was evolved. It was then fractionally distilled. After removal of the chloroform and forecuts, the main portion of the material was obtained as a fraction amounting to 114 grams and boiling at 104°–106° C. at 0.1 mm. Hg.

Analysis of this fraction by infrared showed that it consisted mainly of the desired 12,12,13,13-tetrafluoro-13-perfluoroisopropoxy tridecanoyl chloride and contained methyl ester as an impurity. The product was purified by refractionation with separation of the methyl ester boiling at 84° C. at 0.1 mm. Hg and the acid chloride at 103°–104° C. at 0.1 mm. Hg.

Elemental analysis of the acid chloride was: Found (percent): C, 40.5; H, 4.1; Cl, 7.3. Theory (percent): C, 39.3; H, 4.1; Cl, 7.3.

(E)

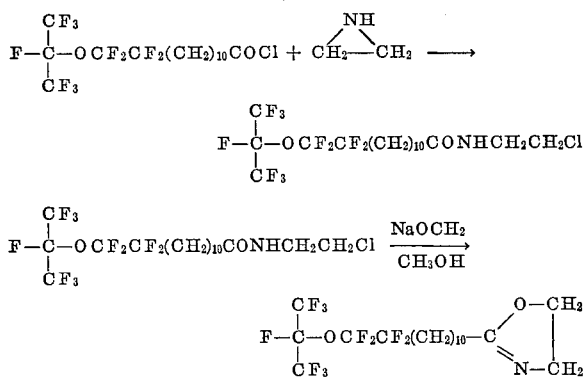

1.8 grams (0.042 mol) of ethyleneimine dissolved in 20 cc. of diethyl ether was added dropwise to a solution consisting of 20 grams (0.041 mol) of 12,12,13,13-tetrafluoro-13-perfluoroisopropoxy tridecanoyl chloride in 60 cc. of diethyl ether over a period of 30 minutes with agitation of the reaction mixture. No precipitate formed. Anhydrous HCl was then passed through the solution for 2 minutes and the solution stirred for 1 hour and then subjected to flash-evaporation. 21 grams of residual liquid was obtained. The 12,12,13,13-tetrafluoro-13-perfluoroisopropoxy - N - (β-chloroethyl)-tridecanamide was not isolated from this, but the residue taken, and 21 grams (0.041 mol) in 50 cc. of CH₃OH added to a solution of 1.5 grams (0.037 mol) of sodium in 100 cc. of CH₃OH.

This solution was heated at reflux for 1 hour. A precipitate began to form after refluxing for 10 minutes. The solution was cooled after the 1-hour reflux and the solution decanted from the precipitate giving 1 gram of solid. The solution was then subjected to flash-evaporation to give 22 grams of residue. This was fractionally distilled under reduced pressure. After removal of the forecuts, there was obtained major fractions of 7 g. at 105°–110° C. at 0.08 mm. Hg and 5 g. at 110°–115° C. at 0.08 mm. of Hg. There was 8 grams of a brown solid residue. Infrared analysis showed that the first fraction contained 80% of the desired 2-(11,11,12,12-tetrafluoro-12-perfluoroisopropoxy dodecyl)oxazoline and 20% of methyl-12,12,13,13 - tetrafluoro-13-perfluoroisopropoxy tridecanoate. The second fraction consisted of 90% of the oxazoline and 10% of the ester. This indicated that the hydrolysis step of the ester to the corresponding acid was not complete and the unhydrolyzed portion remained unchanged upon conversion of the acid to the acid chloride, reaction of the latter with ethyleneimine and cyclodehydrohalogenation of the chloroamide. The two fractions were combined with a similar product obtained in another synthesis and fractionally distilled yielding major fractions at 104°–106° C. at 0.1 mm. Hg pressure. These fractions were combined and redistilled and the product obtained at 102°–103° C. at 0.1 mm. Hg used for elemental analysis and polymerization.

Elemental analysis was: Found (percent): C, 43.2; H, 4.8. Theory (percent): C, 43.6; H, 4.8.

Example 8.—Polymerization of 2-(11,11,12,12-tetrafluoro-12-perfluoroisoproppoxy dodecyl)oxazoline to poly-[N-(12,12,13,13 - tetrafluoro - 13-perfluoroisopropoxy tridecanoyl)ethyleneimine]

3.32 grams (6.71 millimols) of the oxazoline was catalyzed with 0.000837 gram (29.7×10⁻³ millimols) of parachlorophenyl oxazolonium perchlorate and polymerized by heating. The catalyst was added first to a polymerization tube using 6.26 grams of a solution in acetonitrile containing 4.75×10⁻⁶ mol of catalyst per gram of solution. The monomer-to-catalyst mol ratio was 226:1. After removal of the acetonitrile by evaporation in the usual manner, the oxazoline was charged into the tube containing only the catalyst by direct distillation of a synthesis fraction distilling at 102° C. at 0.1 mm. Hg. The tube was degassed, sealed, and heated at 110° C. for 16 hours. The reaction mixture became a clear, colorless viscous liquid after 1 hour and remained so during the remainder of the heating period. Upon cooling, a very soft, waxy product was obtained. This had a reduced viscosity of 0.03 determined as a 1.42% solution in trifluoromethyl benzene. X-day analysis showed it to be a crystalline material and differential thermal analysis gave a melting point of about 110° C. The infrared spectra confirmed the structure of the polymer.

Another polymerization was carried out in a similar manner using a monomer-to-catalyst ratio of 670:1. 4.2 grams of acetonitrile solution containing 4.75×10⁻⁶ mol of parachlorophenyl oxazolonium perchlorate per gram of solution was used (0.00564 gram, 20×10⁻⁶ mol of catalyst). After removal of the acetonitrile, 6.60 grams (13.4 millimols) of the 2-(11,11,12,12-tetrafluoro-12-perfluoroisopropoxy dodecyl) oxazoline was charged to the tube by distillation of synthesis fraction distilling at 102°–103° C. at 0.1 mm. Hg. The degassed and sealed tube was then heated at 110° C. for 20 hours. The contents became a clear, colorless viscous liquid in 2 hours. Upon cooling, a hazy, colorless, soft solid was obtained. This had a reduced viscosity of 0.25 as determined at a concentration of 1.41 grams/100 grams of trifluoromethyl benzene. The polymer was soluble in hexane, amyl acetate, carbon tetrachloride, and 2-trifluoroethanol.

X-ray analysis showed it to be a crystalline material. Evaluation by differential thermal analysis gave a melting point of 111° C. and decomposition of about 377° C.

Example 9.—Preparation of 2-(3,3,4,4,-tetrafluoro-4-per fluoroisopropoxy butyl)-5,6-dihydro-1,3,4-oxazine

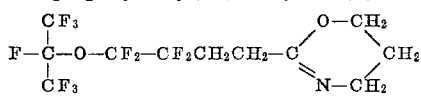

This compound was prepared by the folowing sequence of reactions:

(A)

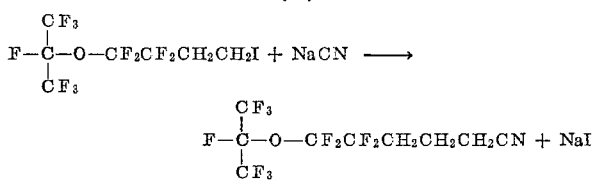

3,3,4,4 - tetrafluoro - 4-perfluoroisopropoxy butyl iodide was first prepared according to the procedure disclosed in U.S. patent application Ser. No. 633,359 filed Apr. 25, 1967, now U.S. Pat. No. 3,514,487, by reaction of perfluoroisopropyl - 2 - iodo-tetrafluoroethyl ether with ethylene. This was then reacted with sodium cyanide in a dimethyl sulfoxide medium. A solution of 10 grams (0.2 mol) of sodium cyanide in 200 ml. of dimethyl sulfoxide was prepared in a 3-necked flask fitted with a thermometer, mechanical agitator and dropping funnel. Solution was effected by heating and stirring. After adjusting the temperature of this solution to 39° C., 89 grams (0.2 mol) of the fluoro-iodo-ether was added dropwise over a period of 1½ hours with stirring of the reaction mixture and maintaining a temperature of 39°–40° C. The temperature was then increased to 80° C. over a period of one hour after which it was allowed to come to room temperature and the reaction mixture stirred overnight. A black solution resulted which was treated with 500 ml. of water. An oil phase separated which was removed and washed with water. Forty-three grams of oily material was obtained. The wash water was combined with the precipitating aqueous phase and then this was extracted three times with diethyl ether. Evaporation of the ether extract gave 8 grams of black, oily material.

Infrared analysis of the material which was obtained initially (43 grams) showed the presence of nitrile, fluoro and aliphatic groups indicating that it was the desired nitrile. The total of crude product was 51 grams of 3,3,4,4-tetrafluoro-4-perfluoroisopropoxy butyronitrile.

(B)

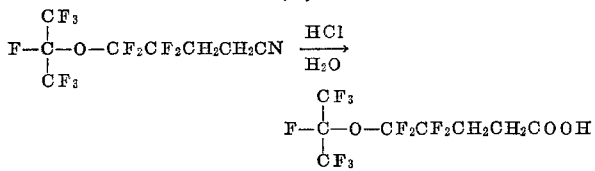

Fifty grams of the crude 3,3,4,4-tetrafluoro-4-perfluoroisopropoxy butyronitrile was heated with 650 cc. of concentrated hydrochloric acid at reflux for a period of 2 hours, the resultant mixture cooled to 20° C., and the oil phase amounting to 35 grams separated from the acid phase. The latter was extracted with 300 cc. of dimethyl ether; then this ether solution was extracted with 50 cc. of 5% aqueous sodium hydroxide and the caustic solution obtained made acid with hydrochloric acid. An oil phase was obtained which was separated, and amounted to 3 grams. The total weight of crude product was 38 grams. This was dissolved in 22 cc. of diethyl ether, the solution extracted twice with 100 ml. of 5% aqueous sodium hydroxide. the extracts combined, then acidified to give a water-wet oily phase which was separated. The acid phase was then extracted with 50 ml. of toluene, the wet oil added to this toluene extract and the water separated to give a toluene solution containing crude 4,4,5,5-tetrafluoro-5-perfluoroisopropoxy pentanoic acid in an amount of 35–38 grams.

(C)

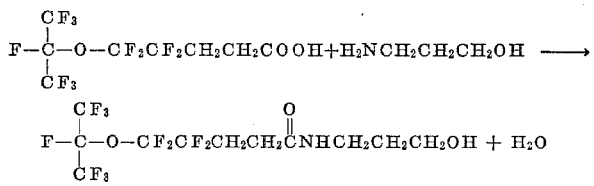

The toluene solution containing 35–38 grams (ca. 0.1 mol) of crude 4,4,5,5 - tetrafluoro-5-perfluoroisopropoxy pentanoic acid was placed in a 3-necked, 250-ml. flask equipped wiah an agitator, dropping funnel, and a short Vigreaux column attached to a distillate receiving system. Then the solution was heated to 40° C. and 10 grams (0.135 mol) of 3-aminopropanol added dropwise while heating to 80° C. over a period of 1 hour after which the mixture was heated slowly to reflux. Four cc. of water was collected. An additional 5 grams of 3-aminopropanol was added and the reaction continued for 4 hours. Then the mixture was transferred to a distillation apparatus and the toluene and excess 3-aminopropanol removed under vacuum. The residue was 41 grams of a light colored viscous oil of crude N-(ω-hydroxypropyl) - 4,4,5,5 - tetrafluoro - 5 - perfluoroisopropoxy pentanamide.

(D)

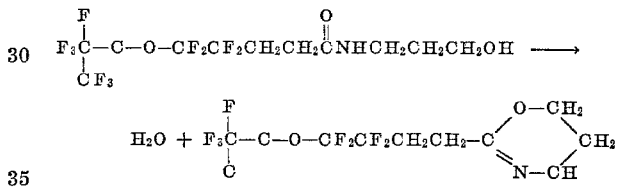

Forty-one grams of the above crude hydroxyamide, prepared by the reaction of 4,4,5,5-tetrafluoro-5-perfluoroisopropoxy pentanoic acid with 3-aminopropanol, and 5 grams of tungstic oxide ($WO_3 \cdot H_2O$) were placed in a flask fitted with an agitator, thermometer and Vigreaux column attached to a distillate receiving system. The mixture was heated with agitation until reaction began at a temperature of 210° C. and reduced pressure adjusted to obtain distillate. Thirty-one grams of distillate was collected over a period of 1 hour at reaction temperatures from 190° to 230° C. and distillation temperatures of 125° to 140° C. at pressures of from 65 to 170 mm. Hg. There remained in the reaction flask 7.2 grams of residue.

The 31 grams of distillate was taken up in 50 cc. of benzene and 4.5 grams of water separated from the solution. Then, after distillation of the benzene, the remaining material was distilled at a pressure of 8 mm. Hg to yield a first cut of 4.8 grams of boiling point 75°–81° C., a second cut of 9.2 grams of boiling point 81°–82° C., a third cut of 2.0 grams of boiling point 82° C. at 8 mm. Hg to 95° C. at 0.5 mm. Hg. There was 8.1 grams of residue. Cut Number 2 was found to be the desired oxazine.

Analysis by gas chromotography showed it to be one product which was identified by infrared analysis. The infrared spectra were compatible with the proposed structure showing strong fluoro groups and absorption at 5.95 microns for the —C=N— of the oxazine ring.

Cut Number 1 was found to consist mainly of the oxazine with some impurity; cut Number 3 was not identified; the 8.1 grams of residue was 95% unreacted hydroxyamide.

Example 10.—Polymerization of 2 - (3,3,4,4-tetrafluoro-4 - perfluoroisopropoxy butyl) - 5,6-dihydro-1,3,4-oxazine to N - (4,4,5,5 - tetrafluoro-5-perfluoroisopropoxy butanoyl)polytrimethylenimine 8.72 grams ($2.2 \times 10^{-2}$ mol) of the oxazine and 0.808 gram ($4.3 \times 10^{-3}$ mol) of methyl tosylate were placed in a standard glass polymerization tube; then, the tube was degassed on a high vacuum system and the tube was sealed. The monomer-to-catalyst ratio was 5.1:1. The tube was heated at 130° C. for 35 minutes to give a solid polymer having a degree of polymerization of 5. This was soluble in trifluoroethanol, chloroform, methanol, methyl ethyl ketone, and benzotrifluoride.

Example 11

Surface energies for a number of the polymers of the instant invention are determined by the contact angle according to the method of Zisman (J. Phys. Chem. [1960] 740). Thin films of polymer are prepared by dipping clean Pyrex-glass slides into an $\alpha,\alpha,\alpha$-trifluorotoluene solution of the polymer and allowing the solution to drain and the solvent to evaporate. The films are dried and annealed by heating the coated slides in a vacuum oven for several hours at a temperature 10° C. below the melting point of the polymer followed by slow cooling to room temperature. Drops of liquid having known surface tensions are then placed on the polymer film on the glass slides, and the contact angles of liquids of known surface tensions measured with a goniometer. Liquids of known surface tension useful for the polymers of the instant invention include dimethyl butane; ethanol; 24% ethanol; 76% water; 34% ethanol 66% water; 48% ethanol 52% water; isooctane; and n-decane. The critical surface energy of the film is calculated from these values as shown by Zisman. Values for the critical sulface energies of films of a number of polymers of the instant invention are tabulated below:

white-cotton print-cloth samples. These samples were prepared by immersion of weighed cloth samples in dilute $\alpha,\alpha,\alpha$-trifluorotoluene solution of the polymer, blotting off excess solution between paper towels and allowing the samples to air dry for 24 hours. The dried samples were then weighed and tested at 23° C. and 50% relative humidity. Increase in weight of the samples was noted as the percent loading.

Water repellancy was determined by the procedure of spray test ASTM D-583-58 in accordance with which a rating of 100 denotes no sticking or wettng of upper surface: 90—slight random sticking or wetting of upper surface; 80—wetting of upper surface at spray points; 70—partial wetting of upper surface; 50—complete wetting of whole upper surface; and 0—complete wetting of whole upper and lower surfaces. The procedure employed in determining the oil repellancy rating is described on pages 323–4 of the April 1962 edition of the Textile Research Journal. This procedure involves gently placing on the sample drops of mineral oil ("Nujol") and n-heptane in varying proportions. The drops are allowed to stand on the sample undisturbed for 3 minutes. After the 3-minute time period, the wetting and penetration of the sample is observed visually. The number corresponding to the mixture containing the highest percentage of n-heptane which does not penetrate or wet the fabric is considered to be the oil-repellancy rating.

The values of the oil repellancy of these polymers follow those of the critical surface energies; those with low surface energies have good oil repellancy values—120 to 130—and those of higher surface energy have lesser oil repellancy values—70 to 80. Water repellancy values were not effected within the range of values of surface energies of the polymers. Results are tabulated below.

TABLE I

| Critical surface energy (dynes/cm.) | R | $R_1$ | $R_2$ | $R_3$ | $R_4$ | $R_5$ | $r$ | $q$ | $n$ |
|---|---|---|---|---|---|---|---|---|---|
| 15.5 | $CF_3$ | $CF_3$ | | | | | 0 | 10 | 2 |
| 14.7 | $CF_3$ | $CF_3$ | | | | | 0 | 1 | 2 |
| 9.8 | $CF_3$ | $CF_3$ | F | F | F | F | 1 | 3 | 2 |
| 9.7 | $CF_3$ | $CF_3$ | F | F | F | F | 1 | 10 | 2 |
| 16.0 | $CF_3$ | $CF_3$ | | | | | 0 | 6 | 3 |
| 15.7 | $CF_3$ | $CF_3$ | | | | | 0 | 2 | 3 |
| 12.1 | $CF_3$ | $CF_3$ | F | F | F | F | 1 | 2 | 3 |
| 11.5 | $C_3F_7$ | $C_3F_7$ | H | H | H | H | 3 | 3 | 2 |
| 32.0 | $Cl_2FCFCFCl$ | $CF_3$ | H | Cl | H | Cl | 3 | 3 | 2 |
| 11.2 | $C_3F_7$ | $C_3F_7$ | H | F | H | $CF_3$ | 1 | 0 | 2 |
| 10.1 | $C_3F_7$ | $C_3F_7$ | F | F | F | $CF_3$ | 2 | 2 | 3 |
| 15.5 | $CF_3$ | $CF_3$ | | | | | 0 | 2 | (¹) |

¹ 50/50 2 and 3.

Example 12

The utility of the polymers of the instant invention in imparting oil and water repellency was demonstrated in tests with polymer-impregnated desized 80 x 80 count,

TABLE II

| R | $R_1$ | $R_2$ | $R_3$ | $R_4$ | $R_5$ | $r$ | $q$ | $n$ | Critical surface energies (dynes/cm.) | Oil repellency rating | Water repellency rating | Loading (percent) |
|---|---|---|---|---|---|---|---|---|---|---|---|---|
| $CF_3$ | $CF_3$ | | | | | 0 | 1 | 2 | 14.7 | 80 | 50 | |
| $CF_3$ | $CF_3$ | | | | | 0 | 10 | 2 | 15.5 | 70 | 50 | 2.2 |
| $CF_3$ | $CF_3$ | F | F | F | F | 1 | 3 | 2 | 9.8 | 130,120 | 50,50 | 3.6, 1.1 |
| $CF_3$ | $CF_3$ | F | F | F | F | 1 | 10 | 2 | 9.7 | 130,130 | 50,50 | 4.7, 5.7 |
| $CF_3$ | $CF_3$ | | | | | 0 | 6 | 3 | 16.0 | 70 | 50 | 3.2 |
| $C_3F_7$ | $C_3F_7$ | H | H | H | H | 3 | 3 | 2 | 11.5 | 65 | 45 | 2.6 |
| $CF_3$ | $CF_3$ | | | | | 0 | 2 | (¹) | 15.5 | 70 | 50 | 3.0 |

¹ 50/50 2 and 3.

We claim:
1. A polymer comprising recurring units of the structure:

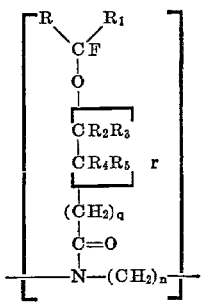

wherein R and R₁, which can be the same or different, are perhalogenated alkyl radicals in which the halogen atoms are chlorine or fluorine, with at least one fluirine atom being attached to each carbon atom; wherein R and $R_1$ together contain a total of from 2 to 8 carbon atoms; wherein $R_2$, $R_3$, $R_4$, and $R_5$ are independently either chlorine, fluorine, hydrogen or perfluoromethyl with not more than one of the substituent groups $R_2$, $R_3$, $R_4$, or $R_5$ on any

unit being trifluoromethyl and not more than two such groups being chlorine; wherein $r=0-5$, wherein $q$ is 0 to 11 with $q$ being at least 1 when $r=0$, and wherein $n$ is 3 or 2 and 3.

2. A polymer in accordance with claim 1 wherein $n=3$.
3. A polymer in accordance with claim 1 wherein R and $R_1$ are trifluoromethyl.
4. A polymer in accordance with claim 1 wherein $R_2$, $R_3$, $R_4$, and $R_5$ are fluorine.
5. A polymer in accordance with claim 1 wherein R and $R_1$ are trifluoromethyl and wherein $r=0$.
6. Poly-[N-(perfluoroisopropoxy - 4,4,5,5 - tetrafluorobutanoyl)trimethyleneimine].

References Cited
UNITED STATES PATENTS

| 3,198,754 | 8/1965 | Ahlbrecht et al. | 260—2 |
| 3,300,274 | 1/1967 | Pittman et al. | 260—2 |
| 3,373,194 | 3/1968 | Fuhrmann et al. | 260—2 |
| 3,459,722 | 8/1969 | Zanger | 260—2 |
| 3,483,141 | 12/1969 | Litt et al. | 260—2 |
| 3,409,647 | 11/1968 | Pittman et al. | 260—535 |

SAMUEL H. BLECH, Primary Examiner

U.S. Cl. X.R.

117—135.5, 140, 148, 155, 161; 260—31.2, 32.8, 33.4, 33.6, 33.8, 239, 244, 465.6, 484, 535, 561, 593

PO-1050
(5/69)

UNITED STATES PATENT OFFICE
CERTIFICATE OF CORRECTION

Patent No. 3,575,890      Dated  April 20, 1971

Inventor(s)  M. Litt, F. Evans, and J. Melillo

It is certified that error appears in the above-identified patent and that said Letters Patent are hereby corrected as shown below:

Column 5, line 31, "  H  " should be --  O  --.
                    "                    "
                  $R_6COH$              $R_6COH$ Column 6, line 48, "dedecafluoro" should be --dodecafluo Column 9, line 8, "reaction time", second occurrence, should be --reaction temperature--;

line 53, "3,370,256" should be --3,470,256--.

Column 18, line 64, " $O-CH_2$" should be -- $O-CH_2$--.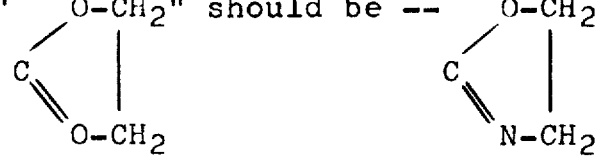

Column 19, line 44, "40°C." should be --400°C.--.

Column 20, line 48, "$OCF_2CF_2(CH_2)CH_2)_{10}COOH$" should be

--$OCF_2CF_2(CH_2)_{10}COOH$--.

Column 21, line 55, "$NaOCH_2$" should be --$NaOCH_3$--.
            $\xrightarrow{CH_3OH}$        $\xrightarrow{CH_3OH}$ Column 22, line 51, "X-day" should be --X-ray--.

Column 23, line 69, "hydroxide." should be --hydroxide,-

UNITED STATES PATENT OFFICE
CERTIFICATE OF CORRECTION

Patent No. 3,575,890        Dated April 20, 1971

Inventor(s) M. Litt, F. Evans, and J. Melillo     PAGE - 2

It is certified that error appears in the above-identified patent and that said Letters Patent are hereby corrected as shown below:

Column 24, line 13, "wiah" should be --with--;

line 35, "$\begin{smallmatrix}F\\|\\F_3C\\|\\C\end{smallmatrix}$" should be --$\begin{smallmatrix}F\\|\\F_3C\\|\\CF_3\end{smallmatrix}$--;

line 35, "$C{\displaystyle\mathop{\diagdown}_{N-CH}}$" should be --$C{\displaystyle\mathop{\diagdown}_{N-CH_2}}$--.

Column 25, line 28, "sulface" should be --surface--.

Claim 1, column 27, line 18, "fluirine" should be --fluorine--.

Signed and sealed this 2nd day of November 1971.

(SEAL)
Attest:

EDWARD M. FLETCHER, JR.
Attesting Officer

ROBERT GOTTSCHALK
Acting Commissioner of Pate